Aug. 16, 1966    G. E. BONIN    3,266,195
EDGE GRINDING
Original Filed Feb. 26, 1962
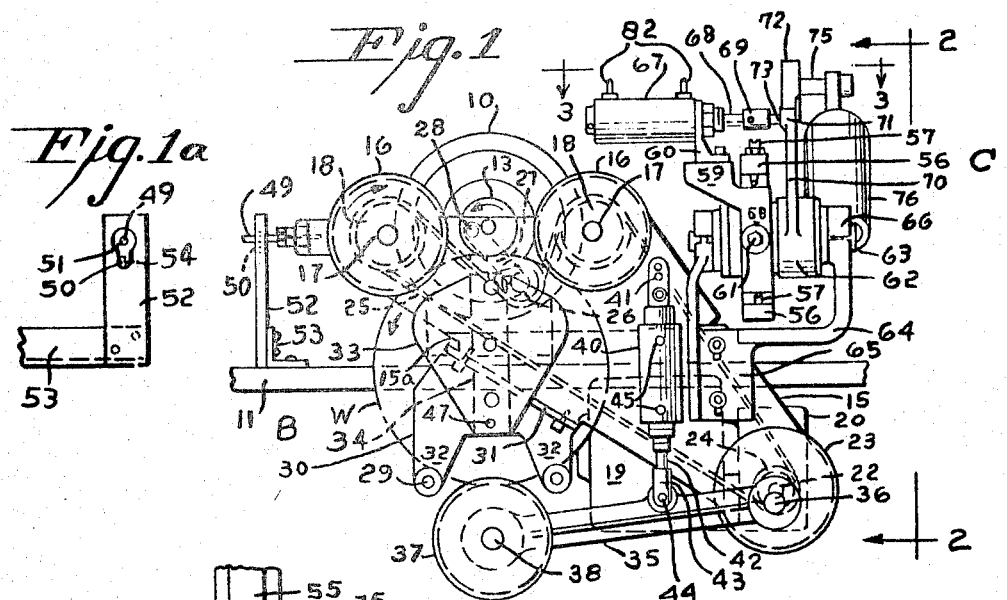
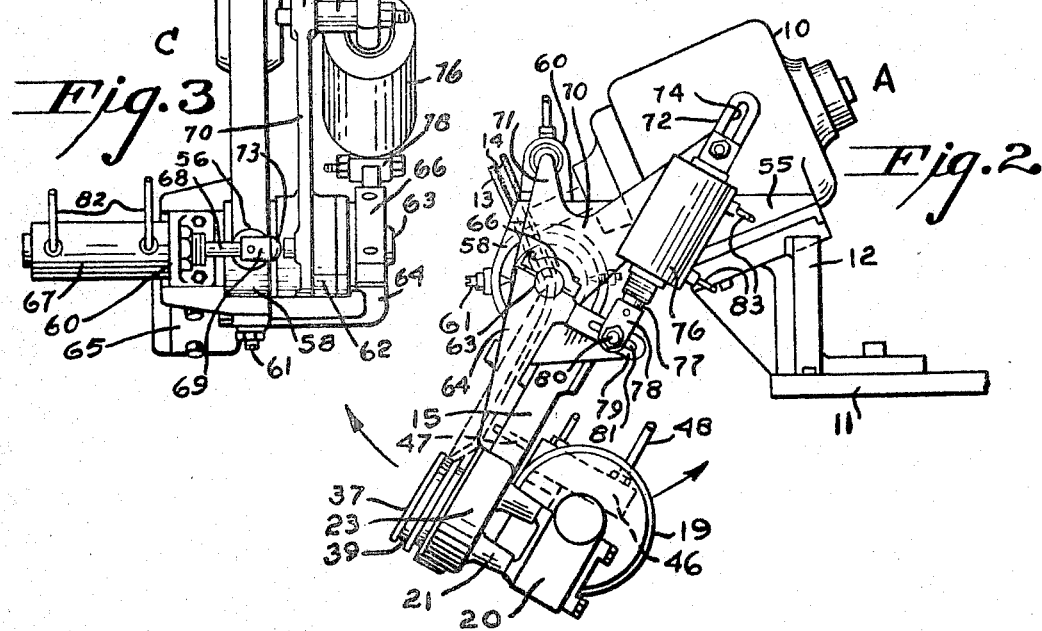
INVENTOR.
GEORGE E. BONIN
BY
ATTORNEY

3,266,195
EDGE GRINDING
George E. Bonin, Addison, N.Y., assignor to Corning Glass Works, Corning, N.Y., a corporation of New York
Original application Feb. 26, 1962, Ser. No. 175,424, now Patent No. 3,186,134, dated June 1, 1965. Divided and this application Oct. 16, 1964, Ser. No. 404,345
11 Claims. (Cl. 51—97)

This invention relates to the machining of edge portions of a workpiece, and more particularly to apparatus for finishing peripheral edge portions of circular glass-like articles to form smooth rounded edges thereon.

This application is a divisional application of my co-pending application Serial No. 175,424 filed February 26, 1962, now Patent No. 3,186,134.

Most commercial machinery utilized in the production of glass articles have a tendency to form parting lines, flashing, ridges and the like about peripheral portions of the article, which must be removed by a finishing operation before the article can be utilized. In the past, it has been customary to remove such parting lines and finish peripheral edge surfaces of glass articles by conventional fire-polishing methods. The ware is usually fire-polished immediately after formation to take advantage of the residual heat of formation, and in many instances is fire-polished while being retained by a mold part utilized in its manufacture.

Although this known expedient is generally satisfactory for finishing edge surfaces of most glass articles, it is completely unsatisfactory for finishing the surfaces of articles manufactured from the rather recently developed class of materials known as glass-ceramics. In the manufacture of articles from this latter class of materials, the articles as first formed, such as by conventional glass-forming methods, possess glass-like characteristics. However, such articles are subsequently subjected to the application of controlled heat to devitrify and convert their glasseous structure into a semi-crystalline or ceramic-like structure. Accordingly, if fire-polishing techniques were to be utilized to remove parting lines, flashing, and the like from the initially formed articles produced in manufacturing glass-ceramics, the heat produced during the fire-polish would tend to partially ceram or predevitrify a localized area of the initially formed glass-like articles, resulting in subsequent structural failure and breakage during the regular ceramming or crystallizing process.

Further, even if it were possible to fire-polish the initially formed articles, without detrimentally affecting their ultimate structural qualities, fire-polishing has the additional disadvantage of producing a beaded edge on the ware which renders it virtually impossible to provide the ware with a uniform glazing. The beaded edge produces low surface tension therealong, and accordingly only an extremely thin coat of glazing adheres to the beaded portion, thus resulting in an unattractive finished product. In addition, once the article has been subjected to the ceramming or crystallizing process to convert it into a glass-ceramic, it would be impossible to remove a fin or parting line by fire-polishing unless the temperature utilized was above the liquidus; however, the use of such a temperature would set up such a high degree of internal stresses as to produce chipping and structural failure in the ware.

Therefore, realizing the fact that conventional fire-polishing methods could not feasibly be utilized to finish edge portions of articles formed from glass-ceramic materials, I set forth to devise a novel method and apparatus which would not only obviate and solve this finishing problem peculiar to glass-ceramics, but which would also be economically feasible from a commercial standpoint.

The parting line or flashing which must be removed is usually formed about an outer peripheral edge of the article, particularly when forming disc-shaped or circular dish-like articles such as are utilized in tableware.

It became apparent that if parting lines and the like were to be removed and peripheral edge portions provided with a smooth rounded surface by machining, two main obstacles had to be overcome before proceeding in this direction. The first problem resided in the fact that when a rounded surface other than a half round is machined or ground by an abrasive member, an edge is inherently produced on the rounded surface at the point of termination of contact with the abrasive means, thus producing an undesirable condition. The second obstacle related to the fact that although the outer peripheries of the articles to be finished may be substantially circular, even a slight out-of-roundness tends to produce uneven grinding when the peripheral edge portions to be surfaced are continuously presented in the usual rigid or fixed relationship to the abrasive member.

A preferred embodiment of the present invention set forth and described in detail herein, in its simplest form comprises a revolving abrasive means or rotating grinding wheel for finishing edge portions of a workpiece; a ware chuck or workpiece retaining means for rotating a workpiece and positioning peripheral edge portions thereof in contact with the revolving abrasive means, with the workpiece retained in various selected orientations with respect thereto; and a universal connecting joint or gimbal means which permits the ware chuck to swing from a loading position to an operating position, to pivot a rotating workpiece while in contact with the rotating grinding wheel, and to maintain edge portions of the rotating workpiece in constant contact with the rotating grinding wheel under a predetermined pressure while permitting the workpiece to fluctuate with respect to the grinding wheel to compensate for out-of-roundness which may be present in the outer periphery of the workpiece.

In sequential order of accomplishing the desired improved results obtainable with my novel advancement in the art, the invention includes the positioning of a workpiece on a ware chuck, the rotation of the workpiece retained by the chuck, the positioning of a peripheral edge portion of the rotating workpiece in contact with a rotating grinding wheel with a predetermined pressure, the continued maintenance of such contact with such pressure in such position for a predetermined period of time, the pivoting of the workpiece about an axis tangential to a periphery thereof at the point of contact with the grinding wheel and while in such contact to a second predetermined position, the continued maintenance of contact with the rotating grinding wheel while in such second predetermined position under the aforementioned pressure for a second period of time, the repositioning of the workpiece about the tangential axis back to the first position while maintaining contact with the grinding wheel under the predetermined pressure for a third period of time, and the removal of the rotating workpiece from the rotating grinding wheel.

The pivoting of the workpiece to the various predetermined positions about an axis tangential to the peripheral edge thereof, at the point of contact with the rotating grinding wheel, obviates the formation of a ridge which might otherwise be formed on the peripheral edge of the workpiece by the grinding wheel if the workpiece were merely rotated in contact with the grinding wheel in a single position or orientation with respect thereto. In addition, the preferred embodiment of my invention includes the utilization of a rotating grinding wheel having a concave groove formed in its outer periphery, wherein the groove is of a width greater than the thickness of the peripheral edge of the workpiece being machined, so that a major arcuate surface of the outer periphery of the rotating workpiece is machined during each predetermined position thereof, thus producing an overlapping of the machining in each position to thereby avoid the possibility of forming grinding ridges. Such overlapping of machining is necessary where the cross-sectional curvature of the outer peripheral surface to be finished is not provided with a single radius such as is a half round, and accordingly a single path with a semi-circularly grooved grinding wheel could not contact the entire curvature of the surface so as to provide a smooth finish.

Although the peripheral edge of the rotating workpiece is maintained in constant contact with the rotating grinding wheel with a predetermined pressure during machining, the ware chuck, retaining the rotating workpiece, is maintained in a floating suspension so that the body or center of the rotating workpiece may fluctuate with respect to the peripheral edge of the rotating grinding wheel to compensate for out-of-roundness which may be present in the peripheral edge of the workpiece. Such floating suspension obviates the possibility of overloading the grinding wheel drive shaft or producing excessive and uneven grinding in certain peripheral portions of the out-of-round workpiece, which would otherwise be experienced if the chuck were held in a rigid or fixed position during machining.

It thus has been an object of my invention to obviate the problems heretofore encountered in removing parting lines and the like from articles formed of glass-ceramic materials.

A further object of my invention has been to provide means for finishing outer peripheral edges of glass-like articles which cannot feasibly be fire-polished without detrimentally affecting the ultimate physical characteristics thereof.

An additional object of my invention has been to provide improved apapratus for uniformly grinding peripheral edge portions of articles which may be slightly out-of-round, wherein the article is rotated and peripheral edge portions thereof are maintained in contact with a rotating grinding wheel with a constant pressure while the center of the article is permitted to fluctuate with respect to the grinding wheel to compensate for out-of-roundness in the outer periphery of the article.

A still further object of my invention has been to provide an improved apparatus for smoothly rounding the peripheral edge portions of a rotating workpiece wherein the workpiece is manipulated between various predetermined positions while the peripheral edge thereof is maintained in constant contact with a rotating grinding wheel having a uniquely preformed outer periphery.

A still further object of my invention has been to provide edge grinding apparatus having a novel workpiece retaining chuck connected to a supporting frame by a gimbal means which permits the chuck to swing about one axis between a loading position and an operating position where it is floatably suspended to compensate for out-of-roundness in the workpiece being operated on, and which also permits the chuck to be pivoted about a second axis, normal to the first axis, to vary the position of the workpiece while it is being worked upon.

These and other objects of my invention will be apparent to those skilled in the art from the following disclosure and accompanying drawings in which:

FIGURE 1 is a front elevational view of a ware chuck embodying my invention, schematically illustrating the relationship of the grinding wheel with respect thereto when the chuck is in its operating position, and showing the novel gimbal or connecting means utilized to suspend the ware chuck from a supporting frame;

FIGURE 1a is a fragmental side elevational view of a guide arm utilized in cooperation with the gimbal means to guide and support the ware chuck;

FIGURE 2 is a side elevational view taken along line 2—2 of FIGURE 1, with portions of the ware chuck omitted for the purposes of clarity; and, FIGURE 3 is a top plan view of the gimbal means taken along line 3—3 of FIGURE 1.

As shown in the drawings, the apparatus is composed of three main parts including a grinding wheel assembly designated as A, a ware chuck or workpiece retaining assembly designated as B, and a gimbal or connecting joint assembly designated as C. Referring now to FIGURE 2, the grinding wheel assembly A includes an electric drive motor 10 connected to a support frame 11 by means of a mounting bracket 12. A rotating abrasive member 13, preferably in the form of a diamond grinding wheel, is secured to the end of the drive shaft of motor 10. A concave recess or groove 14 is formed in the outer periphery of the wheel 13. The groove 14 is formed with a width greater than the thickness of the edge of the workpiece to be ground, so that the machining surface overlies and operably engages a major arcuate portion of the edge of the workpiece being finished.

The chuck means or workpiece retaining assembly B shown in FIGURES 1 and 2 has a main housing body 15. A pair of ware drive wheels 16, for rotating a workpiece retained by the chuck, are each rotatably mounted forwardly of the housing 15 on a shaft 17 journaled for rotating within the housing. A sheave 18 is secured to the rearward end of each of the shafts 17 within the housing 15. A drive motor 19, having a gear reduction box 20, is secured to a plurality of bosses 21 extending outwardly from a back surface of the housing 15. A drive shaft 22 of the gear reduction box 20 extends into a cylindrical bossed portion 23 of housing 15. A sheave 24 is secured to the drive shaft 22 in transverse alignment with the sheaves 18 positioned in the housing 15. An endless drive belt 25 connects the sheaves 18 with the driven sheave 24 to rotate the drive wheels 16.

A belt adjustment roller 26, for tensioning the belt 25, is rotatably mounted on an adjustable arm 27 pivotally connected to the housing 15 at 28. A ware support bracket 30, having a mounting pad 31, is secured to a mating mounting portion 15a formed on housing 15. The bracket 30 has a pair of downwardly extending leg portions 32, each having a ware support pin 29 extending forwardly thereof for initially supporting lower edge portions of a workpiece delivered to the chuck. A backing member 33, for supporting a back portion of ware initially delivered to the chuck, overlies a portion of the front surface of the housing 15 and ware support 30, and is connected to such surfaces by a mounting pad 34.

A chucking arm 35 is pivotally mounted at one end on the front surface of the cylindrical bossed portion 23 of housing 15 by means of a shoulder screw 36. A chucking wheel 37 is journaled for rotation on a pin 38 extending through the other end of the chucking arm 35. The wheels 16 and 37 all lie in a common plane, and have peripheral recessed portions 49 for retaining the edge of a workpiece.

An air cylinder 40 is pivotally connected at its upper end to a connecting pad 41 formed on the front face of the housing 15. The air cylinder 40 is provided with an operating piston 42 which has a yoke member 43 secured to the outer end thereof. The yoke member 43 is pivotally connected to chucking arm 35, intermediate its ends, by means of a pivot pin or shoulder screw 44. A pair of air lines 45, connected to the cylinder 40, communicate with a suitable control valve (not shown) which is supplied with a source of fluid under pressure.

An ejector cylinder 46 (see also FIGURE 2) having an ejector plunger or pin 47 extending through backing member 33 and mounting pad 34 to eject a piece of ware from the chuck, is mounted on a back surface of the ware support bracket 30. Connecting lines 48 operably connect the ejector cylinder 46 with suitable valve means (not shown) supplied with a source of fluid pressure.

The housing 15 has a guide pin 49 projecting outwardly from an upper side edge thereof. The guide pin 49 is positioned for limited travel within an elongated slot 50 (see also FIGURE 1a), having an upper circular recessed portion 51 formed in a guide arm 52 secured to the frame 11 by an angle 53. The lower end 54, of the elongated slot 50, forms a stop abutment portion for the guide pin 49 when the chuck is in its idle or loading position, whereas the circular recessed portion 51 cooperates with the gimbal means to allow the chuck to float when in its operating position.

A workpiece or ware W (indicated in chain lines in FIGURES 1 and 2) is shown in an operating position, chucked into engagement with the drive wheels 16 by chucking wheel 37, and swung into operating engagement with the rotating grinding wheel 13.

Referring now to the gimbal or connecting joint assembly C, a support bracket 55, connected to the support frame 11 by means of mounting bracket 12, has a yoke-shaped end portion 56. A pair of axially aligned vertically extending pins 57, passing through opposed portions of the yoke-shaped end portion 56, suspend a support ring 58 for rotational movement about the axis of the pins 57. The support ring 58 has an upwardly offset arm 59 having a cylinder support bracket 60 mounted thereon.

A pair of axially aligned horizontally extending pivotal support pins 61, whose axis lies in the same vertical plane as the axis of pins 57 and normal to such axis, extends through transverse sidewall portions of the support ring 58, and support a cylindrical housing 62 for pivotal movement about their horizontally extending axis. The housing 62 contains bearings (not shown) for journaling a pivot shaft 63 about a longitudinal axis extending perpendicular to both the axes of pins 57 and pins 61. A bifurcated chuck support bracket 64 having a chuck mounting pad 65 at its lower end, for mounting the chuck assembly B on the gimbal assembly C, is secured to pivot shaft 63 by means of clamping caps 66.

An air cylinder 67 having a plunger 68, for swinging the ware chuck about the axis of support pins 61 into an operating position and for maintaining edge portions of a workpiece rotatably retained by the chuck in constant contact with grinding wheel 13 with a predetermined pressure, is mounted on the upward offset arm 59 of support ring 58 by means of cylinder support bracket 60. A plate-like flange 70, having a vertical arm portion 71 and an inclined arm portion 72, extends radially outwardly from and is formed integrally with cylindrical housing 62. Vertical arm portion 71 has a wear button 73 in alignment with and engageable by a nose portion 69 on plunger 68. When the cylinder 67 is actuated, the nose portion 69 pushes against wear button 73 to swing the chuck assembly B about the axis of pins 61.

Inclined arm portion 72 has a slotted portion 74 for adjustably mounting a cylinder support bracket 75 thereon. An air cylinder 76, having a plunger 77 with a yoke 78 on the end thereof, is pivotally connected at one end to the cylinder support bracket 75. The yoke 78 on the plunger 77 is adjustably connected to a backwardly extending arm 79 formed integral with the bifurcated chuck support bracket 64, by means of a shoulder screw 80 passing through a slotted portion 81 formed in the arm 79. When the cylinder 76 is actuated, the chuck assembly B is pivoted about the axis of shaft 63, which axis, when the chuck assembly is in its operating position with a workpiece in contact with the grinding wheel 13, is tangential to the periphery of both the workpiece and the grinding wheel at the point of contact, and also passes through the longitudinal center of guide pin 49. Both air cylinders 67 and 76 have air lines 82, 83, respectively, connected to suitable valve means (not shown) which are in communication with a suitable source of fluid under pressure.

In operation, with all of the air cylinders deactivated and the chuck assembly B in its idler or loading position with guide pin 49 resting on the stop abutment end 54 of elongated slot 50, and with the chucking arm 35 and chucking wheel 37 in their lowermost position, a workpiece, such as a dinner plate or the like is loaded onto the chuck with lower peripheral edge portions thereof supported by pins 29 and the back thereof resting against backing member 33. Drive motor 19 is energized to rotate the ware drive wheels 16 by means of belt 25, sheave 24 and drive shaft 22. In addition, motor 10 is energized to rotate the grinding wheel 13. Air cylinder 40 is then actuated to pivot the chucking arm 35 about shoulder screw 36 so that chucking wheel 37 engages a lower periphery of the ware or workpiece to lift it off the support pins 29 and into engagement with drive wheels 16. The drive wheels 16 rotate the ware about a center portion thereof, which in the case of a disc-like or dish-shaped article is about an axis extending substantially perpendicular to the front face thereof. During the rotation of the ware, the chucking wheel 37 operates as an idler wheel and is rotated by the rotational movement imparted to it by the rotating ware.

The cylinder 67 is then actuated under a predetermined pressure to move the nose portion 69 of plunger 68 into engagement with wear button 73 formed integral with the vertical arm portion 71 of flange 70 so as to pivot the cylindrical housing 62 about the axis of the support pins 61 and swing the ware chuck upwardly so that peripheral edge portions of the rotating ware operably engage the peripheral groove 14 of the grinding wheel 13. When the chuck or work retaining means B is moved to its work engaging or operating position, the guide pin 49 moves in elongated slot 50 from its lowermost position on the stop abutment portion 54 into a floating position within the circular recessed portion 51 as shown in FIGURE 1a. The constant pressure applied by cylinder 67 maintains the peripheral edge portions of the workpiece in constant contact with the grinding wheel 13 under a predetermined pressure, while support pins 57 and 61, together with guide pin 49 and circular recessed portion 51, permit the central portion of the workpiece to fluctuate with respect to the grinding wheel to compensate for out-of-roundness which may be present in the outer periphery of the workpiece.

After a peripheral edge portion of the rotating workpiece applied to the grinding wheel has been ground for a predetermined period of time, which may be two complete revolutions of the workpiece, air cylinder 76 is actuated to pivot the chuck assembly B and accordingly the workpiece while in contact with the grinding wheel, about the axis of shaft 63 which is tangential to the periphery of the grinding wheel and the rotating workpiece at the point of contact, to a new predetermined position wherein another portion of the peripheral edge is applied to the grinding wheel. Grinding is continued under the constant pressure of cylinder 67 for a second predetermined period of time, which may also be two complete revolutions of the workpiece, and then cylinder 76 is de-energized to pivot the chuck B and accordingly the workpiece, about the tangential axis of shaft 63, back to the first position wherein grinding may be continued for a third predetermined period of time, which may be one revolution on the workpiece. The pivoting action about the axis of shaft 63 between the first and second predetermined positions is accomplished while the workpiece is rotating in constant contact with the grinding wheel 13 under the constant pressure applied by cylinder 67.

Cylinder 67 is then de-energized and the chuck assembly B allowed to swing around pins 61 back to its idler or loading position with the guide pin 47 abutting the stop abutment portion 54 of slot 50, to limit the downward swinging movement of the chuck B. Air cylinder 40 is then deactivated to allow chucking arm 35 and chucking wheel 37 to drop downwardly to its loading position, wherein the ware or workpiece falls away from the drive wheels 16 and rests upon pins 29. Ejector cylinder 46 is then momentarily activated to push ejector pin or plunger 47 forwardly to eject the ware from the ware chuck B, and of course motors 10 and 19 are de-energized.

A coolant is preferably applied to the grinding wheel during grinding in the vicinity of the ware to prolong the life of the wheel. In addition, although it is possible to energize the electric motors and actuate the air cylinders manually, the electric motors are preferably energized upon the initial energization of the machine and the various air cylinders sequentially energized by solenoid valves connected to a suitable timing device.

Although I have disclosed a preferred embodiment of my invention it will be apparent to those skilled in the art that various changes and modifications may be made thereto without departing from the spirit and scope of the appended claims.

I claim:

1. Edge grinding apparatus comprising, rotating abrasive means, chuck means for receiving and operably retaining a workpiece, means for manipulating said chuck means between an operating position with a workpiece in engagement with said rotating abrasive means and an idler position for receiving and removing a workpiece, means for pivoting said chuck means when in its operating position about an axis passing through the engagement between the workpiece and the rotating abrasive means, and means forming a part of said manipulating means for maintaining the workpiece in contact with the rotating abrasive means under a predetermined constant pressure when said chuck means is in its operating position.

2. Apparatus for machining edge portions of articles having substantially circular outer peripheries which comprises, chuck means for receiving and operably retaining an article whose edge portions are to be machined; means for rotating the article in such a manner so that the outer peripheral edges to be machined revolve in a substantially circular path while the article is retained by said chuck means; revolving abrasive means positioned for engagement with peripheral edge portions of the article to be machined; means for manipulating said chuck means into an operating position with edge portions of the article in engagement with said revolving abrasive means with a particular positioning for a selected period of time, while said article rotating means rotates the article retained by said chuck means; and means for pivoting said chuck means, when in its operating position with the edge portions of the article in contact with said revolving abrasive means, about an axis substantially tangential to the edge portions of the article in contact with said revolving abrasive means at the point of contact therewith to a second predetermined position for another selected period of time.

3. Apparatus for producing smooth rounded edge portions on disc-shaped articles and the like which may be slightly out of round comprising; article retaining means for receiving a disc-like article, which may be dished, whose edge portions are to be machined; means for rotating the article about an axis substantially perpendicular to the face thereof while being retained by said retaining means; a rotating abrasive wheel; means for swinging said retaining means into a predetermined operable position with edge portions of the article in contact with said rotating abrasive wheel while the article is revolving in said retaining means by said rotating means; means for retaining edge portions of the article in constant contact with said revolving abrasive wheel with a substantially constant predetermined pressure; means for pivoting said retaining means about an axis substantially tangential to edge portions of the article in contact with said rotating abrasive wheel at the point of contact, and while in such contact, to a new predetermined position; and means for releasing the article from said rotating means while the article is retained by said retaining means.

4. Apparatus for machining edge portions of dish-shaped articles and the like which may be slightly out of round to provide such articles with rounded edge portions which comprises, a rotating grinding wheel, floating chuck means for retaining and rotating a dish-like article and operably positioning edge portions of the rotating article in contact with said rotating grinding wheel with a constant predetermined pressure while compensating for out of roundness which may be present in the article, gimbal means connecting said floating chuck means to a support frame; positioning means, operable through said gimbal means, for pivoting said chuck means about an axis substantially tangential to edge portions of the dish-like article in contact with said rotating grinding wheel, at the point of contact, to a predetermined position; and pressure means, operable through said gimbal means, for swinging said chuck means about an axis perpendicular to said first-mentioned axis between an operating position with the dish-like article in engagement with said rotating grinding wheel under a constant predetermined pressure, and an idle position for loading and unloading articles to be machined.

5. Apparatus for machining edge portions of substantially circular dish-shaped articles to form smooth rounded edges on the outer periphery thereof comprising, rotating abrasive wheel means secured to a support frame; a concave peripheral groove formed in said abrasive wheel, said peripheral groove having a width greater than the thickness of the peripheral edge of the article to be ground; chuck means for retaining and rotating a dish-shaped article to be ground, pivotably and swingably mounted on said support frame adjacent said wheel means; gimbal means connecting said chuck means to said support frame; means for swinging said chuck means about a transverse axis passing through said gimbal means to position peripheral edge portions of an article carried by said chuck means into engagement with said concave peripheral groove portion formed in said rotating abrasive wheel; and means for pivoting said chuck means about a longitudinal axis passing through said gimbal means, normal to said transverse axis, for varying the peripheral edge portion of the article presented to the peripheral groove formed in said abrasive wheel.

6. An edge grinding machine comprising, rotating abrasive wheel means for machining a workpiece, floating chuck means for holding and manipulating the workpiece to be machined, and gimbal means for supporting and floatably suspending said floating chuck means; said floating chuck means comprising a housing body, a pair of workpiece drive wheels mounted on said housing body for rotating a workpiece, a chucking arm pivotally connected to said housing body, a chucking wheel rotatably mounted on said chucking arm, and means connected between said housing body and said chucking arm for pivoting said chucking arm between an operating position with said chucking wheel retaining a workpiece in operable engagement with said drive wheels and an idler position for loading and unloading workpieces from said chuck means.

7. Edge grinding apparatus comprising, rotatable grinding wheel means for machining edge portions of ware to be finished, ware chuck means for retaining and manipulating the ware to be finished, and gimbal means for pivotally suspending said ware chuck means in operable position with respect to said grinding wheel means; said ware chuck means comprising a housing body, ware drive wheels mounted on said housing body, means connected to said housing body for rotating said drive wheels, pin means for retaining ware initially positioned on said chuck means in an inoperable position, means for moving ware positioned on said pin means into operable engagement with said rotating ware drive wheels for imparting rotation to such ware, and means for ejecting ware from said chuck means after the ware has been released from operable engagement with said drive wheels.

8. Edge grinding apparatus comprising rotating abrasive wheel means for machining edge portions of an article to be finished, chuck means for retaining and rotating an article to be finished, and gimbal means for pivotally suspending and manipulating said chuck means to operatively position an article to be finished in engagement with said rotating abrasive wheel means; said gimbal means comprising a support bracket having a yoke-shaped end portion, a pair of axially aligned vertically extending pivot pins extending through the yoke-shaped end portion of said support bracket and pivotally supporting a support ring, a pair of axially aligned horizontally extending pivotal support pins extending through transverse walls of said support ring pivotally supporting a cylindrical housing, a pivot shaft journaled for rotation within said cylindrical housing about an axis perpendicular to the axes of both said vertically extending pins and said horizontally extending pins, and a chuck support bracket secured to said pivot shaft for mounting said chuck means to said gimbal means.

9. Edge grinding apparatus comprising, rotating abrasive wheel means for finishing peripheral edge portions of an article to be machined, chuck means for retaining and rotating an article to be machined, and a connecting assembly for operably supporting and manipulating said chuck means; said connecting assembly comprising a support bracket pivotally retaining a support ring for pivotal movement about a vertical axis, said support ring pivotally retaining a housing for pivotal movement about a horizontal axis lying within the same plane as said vertical axis, and a pivot shaft journaled for rotation within said housing about an axis perpendicular to both said horizontal and vertical axes and tangential to the periphery of said abrasive wheel means at the point where an article to be machined contacts said abrasive wheel means, bracket means secured to said pivot shaft for connecting said chuck means to said connecting assembly, means for swinging said chuck means about said horizontal axis to operably position an article to be machined in contact with said abrasive wheel means, and means connected to said housing for pivoting said chuck means about the axis of said pivot shaft to vary the position of the article while in contact with said abrasive wheel means.

10. Edge grinding apparatus comprising, rotating grinding wheel means, chuck means for retaining and rotating a workpiece, and gimbal means for operably suspending and manipulating said chuck means with respect to said grinding wheel means; said gimbal means comprising a support bracket having a yoke-shaped end portion, a pair of axially aligned pins vertically extending through the yoke-shaped end portion of said support bracket to pivotally support a support ring about a vertically extending axis, a pair of axially aligned pivot pins extending horizontally through transverse sidewall portions of said support bracket pivotally supporting a cylindrical housing for pivotal movement about a horizontal axis extending perpendicular to and in the same plane with said vertical axis, a pivot shaft journaled for rotation within said cylindrical housing about an axis perpendicular to both said vertical axis and said horizontal axis, a support bracket for mounting said chuck means on said gimbal means, pressure means mounted on said support ring for pivoting said cylindrical housing and accordingly said chuck means about said horizontal axis to position a workpiece retained by said chuck means in operable engagement with said rotating grinding wheel means, and means connected between an offset portion of said cylindrical housing and said support bracket for pivoting said bracket means and accordingly said chuck means about the axis of said pivot shaft so as to vary the orientation of a workpiece maintained in contact with a periphery of said grinding wheel means.

11. Apparatus as defined in claim 10 wherein said pressure means includes means for maintaining peripheral surface portions of a workpiece rotatably retained by said chuck means in constant contact with said grinding wheel means with a predetermined pressure while allowing the body of the workpiece to fluctuate with respect to said grinding wheel means to compensate for irregularities in the surface being finished.

References Cited by the Examiner
UNITED STATES PATENTS

| 918,770 | 4/1909 | Sacks | 51—97 |
|---|---|---|---|
| 2,320,235 | 5/1943 | Hjarpe et al. | 51—97 |

ROBERT C. RIORDON, *Primary Examiner.*

LEONARD S. SELMAN, *Examiner.*